United States Patent
Togawa et al.

(10) Patent No.: US 10,760,463 B2
(45) Date of Patent: Sep. 1, 2020

(54) EXHAUST TREATMENT DEVICE FOR DIESEL ENGINE

(71) Applicant: KUBOTA Corporation, Osaka-shi, Osaka (JP)

(72) Inventors: Masayuki Togawa, Sakai (JP); Kazunari Tsujino, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 308 days.

(21) Appl. No.: 15/617,146

(22) Filed: Jun. 8, 2017

(65) Prior Publication Data

US 2017/0370266 A1     Dec. 28, 2017

(30) Foreign Application Priority Data

Jun. 28, 2016  (JP) ................................. 2016-127790

(51) Int. Cl.
*F01N 9/00*     (2006.01)
*F01N 3/02*     (2006.01)
(Continued)

(52) U.S. Cl.
CPC ............. *F01N 9/002* (2013.01); *F01N 3/021* (2013.01); *F01N 3/023* (2013.01); *F01N 3/025* (2013.01);
(Continued)

(58) Field of Classification Search
CPC .. F01N 11/00; F01N 2240/14; F01N 2260/04; F01N 2270/04; F01N 2590/08;
(Continued)

(56) References Cited

U.S. PATENT DOCUMENTS 4,884,398 A * 12/1989 Morita ................... F01N 3/0222
                                                  60/274
8,758,464 B2 * 6/2014 Fujii ....................... F01N 3/035
                                                  422/169
(Continued)

FOREIGN PATENT DOCUMENTS

EP        2578825 A1    4/2013
JP     2011214440 A    10/2011

OTHER PUBLICATIONS

Extended Search Report dated Aug. 22, 2017 in EP Application No. 17173071.6.

*Primary Examiner* — Hung Q Nguyen
*Assistant Examiner* — Diem T Tran
(74) *Attorney, Agent, or Firm* — Panitch Schwarze Belisario & Nadel LLP

(57) ABSTRACT

An exhaust treatment device for a diesel engine includes a parked regeneration requirement notification component, and a parked regeneration start operation component, a regeneration process of a diesel particulate filter includes an automatic regeneration process and a parked regeneration process, the automatic regeneration process is automatically started when an estimation value of particulate material accumulated in the diesel particulate filter reaches a predetermined value, and the parked regeneration process is performed when first and second conditions are satisfied, the first condition being that a parked regeneration requirement notification component performs a notification of a parked regeneration requirement when a number of cancellations of the automatic regeneration process reaches a predetermined value or more, the second condition being that the parked regeneration start operation component is subjected to a start operation during a parked state in which an engine equipped machine is neither traveling nor working.

18 Claims, 2 Drawing Sheets

(51) Int. Cl.

| | |
|---|---|
| *F01N 3/00* | (2006.01) |
| *F01N 11/00* | (2006.01) |
| *F01N 3/36* | (2006.01) |
| *F01N 3/10* | (2006.01) |
| *F01N 3/021* | (2006.01) |
| *F01N 3/30* | (2006.01) |
| *F01N 3/025* | (2006.01) |
| *F01N 3/05* | (2006.01) |
| *F01N 3/023* | (2006.01) |
| *F01N 3/22* | (2006.01) |
| *F01N 3/20* | (2006.01) |
| *F02D 41/04* | (2006.01) |
| *F02D 41/24* | (2006.01) |
| *F02D 41/02* | (2006.01) |

(52) U.S. Cl.
CPC ......... *F01N 3/0238* (2013.01); *F01N 3/0256* (2013.01); *F01N 3/05* (2013.01); *F01N 3/103* (2013.01); *F01N 3/106* (2013.01); *F01N 3/2033* (2013.01); *F01N 3/22* (2013.01); *F01N 3/30* (2013.01); *F01N 3/36* (2013.01); *F01N 11/00* (2013.01); *F01N 2240/14* (2013.01); *F01N 2260/04* (2013.01); *F01N 2270/04* (2013.01); *F01N 2590/08* (2013.01); *F01N 2610/03* (2013.01); *F01N 2610/08* (2013.01); *F01N 2900/0414* (2013.01); *F01N 2900/0421* (2013.01); *F01N 2900/0422* (2013.01); *F01N 2900/08* (2013.01); *F01N 2900/10* (2013.01); *F01N 2900/1616* (2013.01); *F02D 41/021* (2013.01); *F02D 41/022* (2013.01); *F02D 41/029* (2013.01); *F02D 41/042* (2013.01); *F02D 41/2403* (2013.01); *F02D 2200/604* (2013.01); *F02N 2200/0803* (2013.01); *Y02T 10/26* (2013.01); *Y02T 10/47* (2013.01)

(58) Field of Classification Search
CPC ............. F01N 2610/03; F01N 2610/08; F01N 2900/0414; F01N 2900/0421; F01N 2900/0422; F01N 2900/08; F01N 2900/10; F01N 2900/1616; F01N 3/021; F01N 3/023; F01N 3/0238; F01N 3/025; F01N 3/0256; F01N 3/05; F01N 3/103; F01N 3/106; F01N 3/2033; F01N 3/22; F01N 3/30; F01N 3/36; F01N 9/002; F02D 2200/604; F02D 41/021; F02D 41/022; F02D 41/029; F02D 41/042; F02D 41/2403; F02N 2200/0803
See application file for complete search history.

(56) References Cited

U.S. PATENT DOCUMENTS

| | | | | |
|---|---|---|---|---|
| 8,919,098 | B2* | 12/2014 | Barucchi | F01N 9/002 |
| | | | | 60/274 |
| 9,719,440 | B2* | 8/2017 | Nishizawa | F01N 3/023 |
| 2005/0000209 | A1* | 1/2005 | Takahashi | F01N 3/0231 |
| | | | | 60/286 |
| 2005/0223701 | A1* | 10/2005 | Sato | F01N 3/0235 |
| | | | | 60/295 |
| 2008/0208431 | A1 | 8/2008 | Abraham et al. | |
| 2010/0089035 | A1* | 4/2010 | Kamiya | E02F 9/00 |
| | | | | 60/277 |
| 2011/0203261 | A1 | 8/2011 | Kotrba et al. | |
| 2012/0204537 | A1* | 8/2012 | Dea | F01N 9/002 |
| | | | | 60/273 |
| 2013/0068107 | A1 | 3/2013 | Haseyama et al. | |
| 2013/0133315 | A1 | 5/2013 | Shibutani et al. | |
| 2013/0167507 | A1* | 7/2013 | Barucchi | F01N 9/002 |
| | | | | 60/274 |
| 2013/0186074 | A1* | 7/2013 | Kanba | F01N 3/2033 |
| | | | | 60/286 |
| 2015/0248794 | A1* | 9/2015 | Hashimoto | E02F 9/2066 |
| | | | | 701/50 |

\* cited by examiner

EXHAUST TREATMENT DEVICE FOR DIESEL ENGINE

BACKGROUND OF THE INVENTION

(1) Field of the Invention

The present invention relates to an exhaust treatment device for a diesel engine.

(2) Description of Related Art

In a conventional exhaust treatment device for a diesel engine, cancellation of the automatic regeneration process easily occurs. The frequently repeated cancellation causes a large amount of liquid fuel to remain in the combustible gas generator and consequently, fuel concentration of the air-fuel mixture gas in the combustible gas generator is excessively heightened, thereby inhibiting catalytic reaction. This causes a situation in which regeneration of the DPF is obstructed even though the regeneration process is resumed.

SUMMARY OF THE INVENTION

An object of the present invention is to provide an exhaust treatment device for a diesel engine capable of suppressing a situation in which regeneration of the DPF is obstructed by cancellation of the automatic regeneration process.

A configuration is employed, in which a DPF disposed in an engine exhaust passage; a combustible gas generator including a gas generation catalyst; and an electronic control device are included, a regeneration process of the DPF is performed according to an instruction of the electronic control device, in the regeneration process of the DPF a liquid fuel and air is supplied to the combustible gas generator during engine operation, a combustible gas is generated by a catalytic reaction of an air-fuel mixture gas of the liquid fuel and the air due to the gas generation catalyst, a temperature of an engine exhaust is raised by combustion of the combustible gas, and PM accumulated in the DPF is burned off by heat of the engine exhaust, a parked regeneration requirement notification component; and a parked regeneration start operation component are included, wherein the regeneration process of the DPF includes an automatic regeneration process and a parked regeneration process, the automatic regeneration process is automatically started when an estimation value of the PM accumulated in the DPF reaches a predetermined automatic regeneration start determination value, the parked regeneration process is performed when a first condition and a second condition are satisfied, the first condition being that the parked regeneration requirement notification component performs a notification of a parked regeneration requirement when a number of cancellation of the automatic regeneration process reaches a predetermined parked regeneration requirement determination value or more, the second condition being that the parked regeneration start operation component is subjected to a start operation during a parked state in which an engine equipped machine is neither traveling nor working.

The present invention exhibits the following effects.

In the present invention, before cancellation of the automatic regeneration process (S2) is frequently repeated, a driver or the like is led to conduct the parked regeneration process (S11) in which the regeneration process is hardly cancelled. This prevents a situation in which a large amount of liquid fuel (6) remains in the combustible gas generator (5), thereby suppressing a situation in which regeneration of the DPF (3) is obstructed by cancellation of the automatic regeneration process (S2).

DETAILED DESCRIPTION OF PREFERRED EMBODIMENTS

Figure 1:
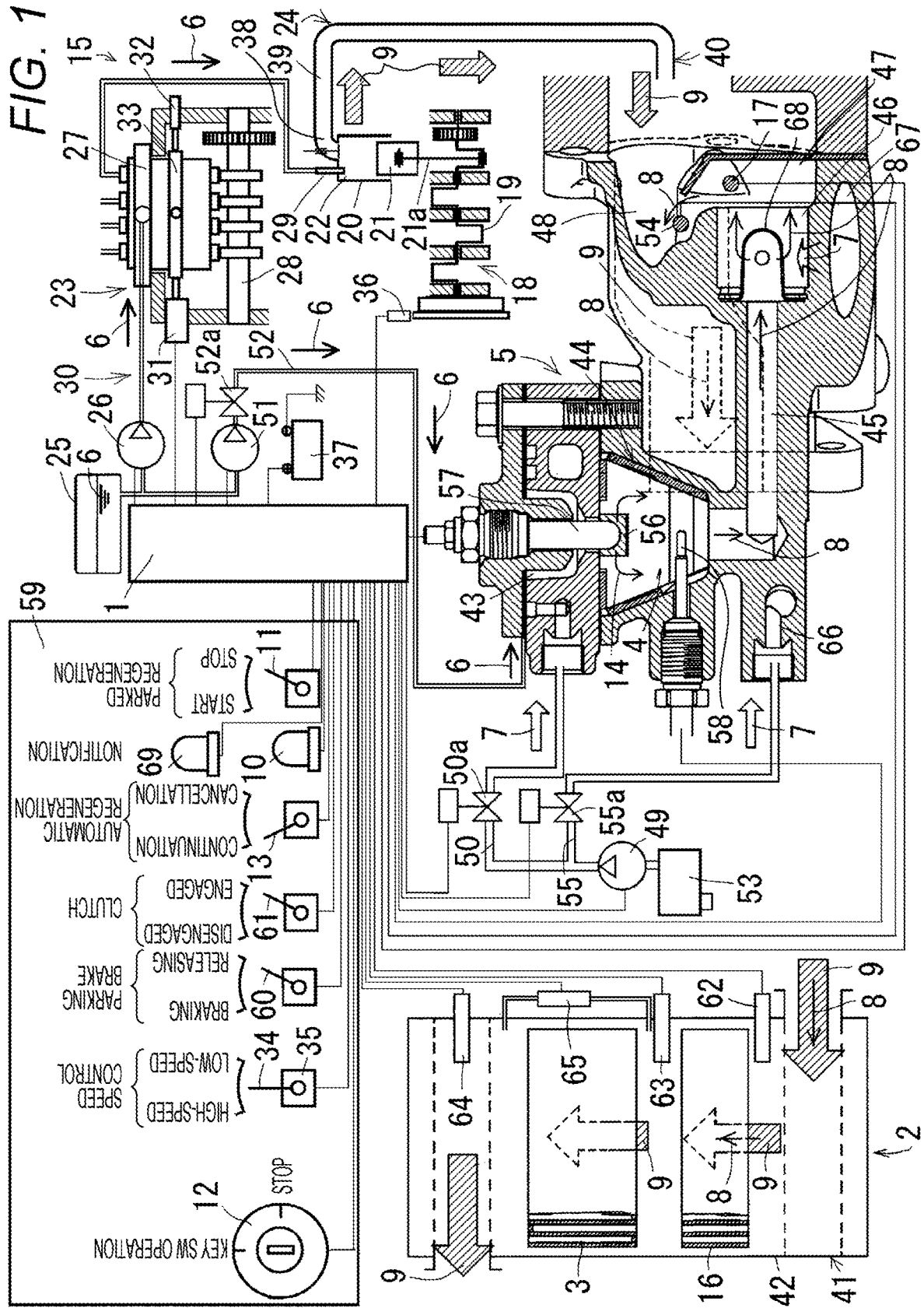
FIG. 1 is a schematic view of a diesel engine equipped machine according to an embodiment of the present invention.
Figure 2:
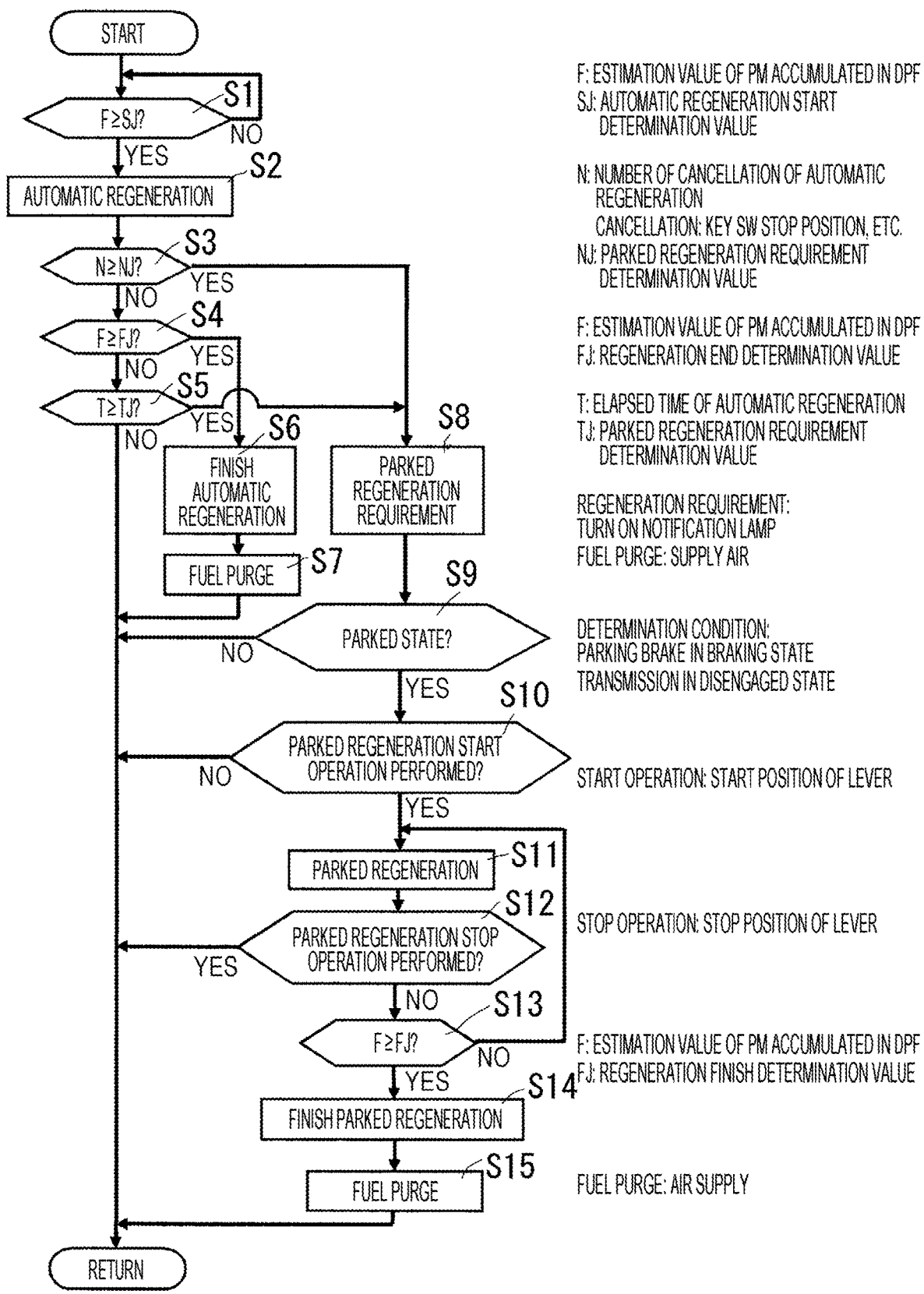
FIG. 2 is a flow chart of a regeneration process of a DPF performed by an electronic control device used in the embodiment of FIG. 1.

FIGS. 1 and 2 illustrate a diesel engine equipped machine according to an embodiment of the present application.

The engine equipped machine is equipped with a diesel engine (15), and also includes a traveling part (not shown) and working equipment (not shown).

The engine equipped machine may be an industrial machine having a traveling part and working equipment, for example, agricultural machinery such as an agricultural tractor and a rice transplanter, construction machinery such as a backhoe, and transporting apparatuses such as a forklift.

The working equipment includes rotary equipment or the like in the agricultural tractor, and planting equipment or the like in the rice transplanter.

Referring to FIG. 1, the diesel engine (15) mounted on the engine equipped machine includes a crank shaft (19) installed in a crank case (18), a piston (21) fitted into a cylinder (20), a connecting rod (21a) disposed between the crank shaft (19) and the piston (21), a combustion chamber (22) in the cylinder (20), an intake device (not shown), a fuel supply device (23), an electronic governor (30), and an exhaust device (24).

The intake device supplies air (7) to the combustion chamber (22).

The fuel supply device (23) includes a fuel tank (25), a fuel feed pump (26), a fuel injection pump (27), a fuel injection cam shaft (28), and a fuel injection valve (29) in the combustion chamber (22). A liquid fuel (6) in the fuel tank (25) is forcibly fed to the fuel injection pump (27) by the fuel feed pump (26), then injected by the fuel injection pump (27) driven by the fuel injection cam shaft (28) to the combustion chamber (22) from the fuel injection valve (29), and combusted by compression heat of air (7) in the combustion chamber (22). The liquid fuel (6) is light oil.

The electronic governor (30) controls an engine speed.

The electronic governor (30) includes a quantity control section of an electronic control device (1), a governor actuator (31), and an urging member (32). A fuel quantity control rack (33) of the fuel injection pump (27) is pressed onto the governor actuator (31) by an urging force of the urging member (32), and a quantity control position of the fuel quantity control rack (33) is adjusted according to the operation of the governor actuator (31).

The electronic control device (1) is electrically connected with an accelerator sensor (35) configured to detect a speed control setting position information of an accelerator operation component (34) and an actual rotation number sensor (36) configured to detect a rotation number information of the crank shaft (19).

The electronic governor (30) allows the quantity control section of the electronic control device (1) to drive the governor actuator (31), controls the quantity control position of the fuel quantity control rack (33) of the fuel injection pump (27), and controls an injection quantity of the liquid fuel (6) injected to the combustion chamber (22) from the fuel injection valve (29) so as to reduce a difference between a target rotation number and an actual rotation number detected on the basis of accelerator operation position information.

An engine ECU is used as the electronic control device (1). The engine ECU is an abbreviation of an engine electronic control unit which is a microcomputer.

A linear solenoid is used as the governor actuator (31).

An accelerator operating lever is used as the accelerator operation component (34). An accelerator operating pedal, an accelerator operating button, or an accelerator operating switch can be used as the accelerator operation component (34).

The electronic control device (1) is connected with a battery (37) and a key switch (12). When the key switch (12) is turned to an engine operation position, power from the battery (37) is supplied to each part of the engine to operate the engine, and when the key switch (12) is turned to an engine stop position, the power supply from the battery (37) to each part of the engine is stopped, then the fuel quantity control rack (33) is pushed to a fuel non-injection position by an urging force of an engine stop spring (not shown) in the governor actuator (31), and the injection of the liquid fuel (6) from the fuel injection valve (29) is stopped, thereby stopping the diesel engine (15).

The exhaust device (24) discharges engine exhaust (9) from the combustion chamber (22).

The exhaust device (24) includes an engine exhaust passage (2). The engine exhaust passage (2) includes an exhaust port (38), an exhaust manifold (39), an engine exhaust processing passage (40) disposed on an exhaust downstream side of the exhaust manifold (39), and an exhaust treatment device (41) provided in the engine exhaust processing passage (40). The engine exhaust (9) from the combustion chamber (22) is treated by the exhaust treatment device (41) and then discharged from the engine exhaust passage (2) into atmosphere.

The exhaust treatment device (41) treats the engine exhaust (9).

The exhaust treatment device (41) includes a DPF (3) disposed in the engine exhaust passage (2), a combustible gas generator (5) containing a gas generation catalyst (4), and the electronic control device (1).

The exhaust treatment device (41) performs a regeneration process (S2), (S11) of the DPF (3) according to an instruction of the electronic control device (1).

In the regeneration process (S2), (S11) of the DPF (3), the liquid fuel (6) and the air (7) are supplied to the combustible gas generator (5) during engine operation. The combustible gas (8) is generated by the catalytic reaction of the gas generation catalyst (4) of the air-fuel mixture gas (14) of the liquid fuel (6) and the air (7), the temperature of the engine exhaust (9) is raised by the combustion of the combustible gas (8), and the heat of the engine exhaust (9) burns off the PM accumulated in the DPF (3).

An advantage of the exhaust treatment device (41) is to enable continuous use of the DPF (3) due to the regeneration of the DPF (3).

The DPF (3) captures the PM in the engine exhaust (9).

The DPF is an abbreviation of a diesel particulate filter, and the PM is an abbreviation of a particulate material. Inside the DPF (3), a large number of cells are arranged in the axial direction to form a wall-flow ceramic honeycomb structure in which an inlet and an outlet of adjacent cells are alternately sealed.

A DPF case (42) is disposed in the engine exhaust processing passage (40), and houses the DPF (3).

The electronic control device (1) is used in common with the electronic governor (30).

The combustible gas generator (5) is disposed in the engine exhaust processing passage (40) on an exhaust upstream side of the DPF (3).

The combustible gas generator (5) includes an air-fuel mixer (43), a catalyst storage chamber (44) communicated with an outlet of the air-fuel mixture gas of the air-fuel mixer (43), the gas generation catalyst (4) contained in the catalyst storage chamber (44), a combustible gas passage (45) communicated with a gas outlet of the gas generation catalyst (4), a secondary air mixer (46) communicated with a gas outlet of the combustible gas passage (45), an ignition chamber (47) communicated with a gas outlet of the secondary air mixer (46), and a combustible gas merged exhaust passage (48) communicated with a gas outlet of the ignition chamber (47). The combustible gas merged exhaust passage (48) forms a part of the engine exhaust processing passage (40) on an exhaust upstream side of the DPF (3).

The combustible gas generator (5) includes a secondary air passage (66), and a secondary air outlet (67) thereof is communicated with the secondary air mixer (46). The secondary air mixer (46) includes a cap-like gas nozzle (68) communicated with the gas outlet of the combustible gas passage (45). The combustible gas (8) injected in a radial direction of the secondary air mixer (46) from the cap-like gas nozzle (68) is mixed with secondary air (7) swirling in a circumferential direction of the cap-like gas nozzle (68).

The air-fuel mixer (43) is connected with an air introducing passage (50) derived from an air supply pump (49) and a fuel introducing passage (52) derived from a fuel supply pump (51). The air (7) purified at an air cleaner (53) and the liquid fuel (6) in the fuel tank (25) are introduced into the air-fuel mixer (43) to form the air-fuel mixture gas (14) of the liquid fuel (6) and the air (7).

The gas generation catalyst (4) is an oxidation catalyst and accelerates oxidization of the air-fuel mixture gas (14) by a catalytic reaction, and the reaction heat thereof thermally decompose the liquid fuel (6) to produce the combustible gas (8) having a lower temperature ignitability. A carrier of the gas generation catalyst (4) is formed of an iron-chromium wire woven into a truncated cone shape, and carries rhodium as a catalyst component.

The secondary air mixer (46) communicates with the gas outlet of the combustible gas passage (45) and the secondary air outlet (67) of the secondary air passage (66). A secondary air inlet of the secondary air passage (66) is connected with a secondary air introducing passage (55) derived from the air supply pump (49).

The combustible gas (8) and the secondary air (7) purified at the air cleaner (53) are introduced into the secondary air mixer (46). The combustible gas (8) and the secondary air (7) are mixed in the secondary air mixer (46), then the combustible gas (8) containing the secondary air (7) passes through the ignition chamber (47) from the secondary air mixer (46) to be merged with the engine exhaust (9) passing through the combustible gas merged exhaust passage (48), and is transmitted to the DPF (3) on an exhaust downstream side. The combustible gas (8) is ignited in the ignition chamber (47) as required.

A starting catalyst (56) is provided at an inlet of the air-fuel mixture gas of the gas generation catalyst (4). An electric heater (57) is inserted into the starting catalyst (56), and a catalyst temperature sensor (58) is inserted into the gas outlet of the gas generation catalyst (4).

A carrier of the starting catalyst (56) is a mat of alumina fiber, and carries rhodium as a catalyst component. The carrier of the starting catalyst (56) has less vacancy in the structure and higher retentivity of the liquid fuel (6) than the carrier of the gas generation catalyst (4).

The air supply pump (49) is an electrically operated blower, and the fuel supply pump (51) is an electrically operated pump.

The air introducing passage (50), the fuel introducing passage (52), and the secondary air introducing passage (55) respectively includes electrically operated control valves (50a), (52a), (55a).

The air supply pump (49), the fuel supply pump (51), the control valves (50a), (52a), (55a), the electric heater (57), and the catalyst temperature sensor (58) are electrically connected to the electronic control device (1).

In the regeneration process (S2), (S11) of the DPF (3), the electric heater (57) generates heat according to an instruction from the electronic control device (1) to preheat the starting catalyst (56) and then, the air-fuel mixture gas (14) is supplied to starting catalyst (56). The catalytic combustion of the starting catalyst (56) warms-up the gas generation catalyst (4), and when the temperature of the gas generation catalyst (4) reaches a predetermined warming-up end temperature, the quantity of the air-fuel mixture gas (14) supplied to the gas generation catalyst (4) is increased, so that the air-fuel mixture gas (14) is diffused into the entire gas generation catalyst (4), thereby generating the combustible gas (8) by the catalytic reaction.

The exhaust treatment device (41) includes a parked regeneration requirement notification component (10) and a parked regeneration start operation component (11).

The regeneration process (S2), (S11) of the DPF (3) includes an automatic regeneration process (S2) and a parked regeneration process (S11).

The automatic regeneration process (S2) automatically starts when an estimation value (F) of the PM accumulated in the DPF (3) reaches a predetermined automatic regeneration start determination value (SJ).

The parked regeneration process (S11) is performed when a first condition and a second condition described below are satisfied.

The first condition is that the parked regeneration requirement notification component (10) performs a notification of a parked regeneration requirement (S8) when a number of cancellation (N) of the automatic regeneration process (S2) reaches a predetermined parked regeneration requirement determination value (NJ) or more.

The second condition is that the parked regeneration start operation component (11) is subjected to a start operation in a parked state in which the engine equipped machine is neither traveling nor working.

When the parked regeneration start operation component (11) is operated under the above conditions, the automatic regeneration process (S2) is switched to the parked regeneration process (S11).

According to this embodiment, the parked regeneration process (S11) is performed when the number of cancellation (N) of the automatic regeneration process (S2) reaches a parked regeneration requirement determination value (NJ) or more, the notification of the parked regeneration requirement (S8) is performed, and the starting operation of the parked regeneration start operation component (11) is performed while the engine equipped machine is in a parked state. The parked regeneration process (S11) is performed on the initiative of a driver or the like, which motivates the driver or the like to complete the regeneration process. Accordingly, the regeneration process is hardly cancelled intentionally by a driver or the like for example by operating a key switch (12) to stop the engine even when traveling or working of the engine equipped machine is finished at a midpoint of the regeneration process. Since the parked regeneration process (S11) is performed in a parked state in which the engine equipped machine is neither traveling nor working, the regeneration process has no risk of cancellation due to an engine stall caused by an overload of traveling or working.

In this manner, before cancellation of the automatic regeneration process (S2) is frequently repeated, the exhaust treatment device (41) leads a driver or the like to conduct the parked regeneration process (S11) in which the regeneration process is hardly cancelled. This prevents a situation in which a large amount of liquid fuel (6) remains in the combustible gas generator (5), thereby suppressing a situation in which regeneration of the DPF (3) is obstructed by cancellation of the automatic regeneration process (S2).

The exhaust treatment device (41) includes an automatic regeneration notification component (69). The automatic regeneration notification component (69) is configured to notify that the automatic regeneration process (S2) is in progress.

As the automatic regeneration notification component (69) and the parked regeneration requirement notification component (10), lamps disposed on a dashboard (59) of the engine equipped machine are used. The lamp of the automatic regeneration notification component (69) is continuously turned on to notify that the automatic regeneration process (S2) is in progress, and the lamp of the parked regeneration requirement notification component (10) is flashed to notify that a parked regeneration process is required (S8), and is continuously turned on to notify that the parked regeneration process is in progress.

As the automatic regeneration notification component (69) and the parked regeneration requirement notification component (10), a display lamp, an LED, a liquid crystal display, an organic EL display, an alarm buzzer, and the like provided on the dashboard (59) or the like may be used. The LED is an abbreviation of a light emitting diode, and the EL is an abbreviation of electroluminescence.

As the parked regeneration start operation component (11), a start operation lever disposed on the dashboard (59) of the engine equipped machine is used, and the operation is started by turning the lever from the stop position to the start position.

A start operation button disposed on the dashboard (59) or the like, and a start operation pedal disposed in a driver's compartment may be used as the parked regeneration start operation component (11).

The estimation value (F) of the PM accumulated in the DPF (3) is estimated by the electronic control device (1) on the basis of a pressure difference of the engine exhaust (9) between the inlet and the outlet of the DPF (3) detected by a differential pressure sensor (65).

In the exhaust treatment device (41), a number of cancellation (N) of the automatic regeneration process (S2) includes cancellation caused by an engine stop operation using the key switch (12) during the automatic regeneration process (S2) and cancellation due to an engine stall occurred during the automatic regeneration process (S2).

Accordingly, the exhaust treatment device (41) can accurately calculate the practical number of cancellation of the automatic regeneration process (S2) regardless of whether or not the cancellation is performed on the basis of an intention of a driver or the like.

The electronic control device (1) determines the cancellation caused by an engine stop operation using the key switch (12) on the basis of a detection of engine stop operation information of the key switch (12), and determines the cancellation due to an engine stall on the basis of an actual rotation number information of the engine detected by an actual rotation number sensor, to calculate the number of cancellation (N).

The number of cancellation (N) of the automatic regeneration process (S2) may include cancellation of the automatic regeneration process (S2) due to a breakdown.

The parked regeneration requirement determination value (NJ) is preferably any one of four to seven times. The parked regeneration requirement determination value (NJ) may be another value.

The exhaust treatment device (41) includes an automatic regeneration cancelling operation component (13).

The number of cancellation (N) of the automatic regeneration process (S2) includes cancellation by a cancelling operation using the automatic regeneration cancelling operation component (13).

In this manner, since the number of cancellation (N) of the automatic regeneration process (S2) includes cancellation based on an intention of a driver or the like by using the automatic regeneration cancelling operation component (13) in the exhaust treatment device (41), the exhaust treatment device (41) can accurately calculate the number of cancellation of the automatic regeneration process (S2). The cancellation by a cancelling operation using the automatic regeneration cancelling operation component (13) enables the engine equipped machine to travel and work in parks or indoors where an emission temperature of the engine exhaust (9) needs to be lowered.

As the automatic regeneration cancelling operation component (13), a cancellation operation lever disposed on the dashboard (59) of the engine equipped machine is used, and the regeneration process is cancelled by turning the cancellation operation lever from a regeneration continuation position to a cancelling position.

A cancellation operation button disposed on the dashboard (59) or the like or a cancellation operation pedal disposed in a driver's compartment may be used as the automatic regeneration cancelling operation component (13).

The electronic control device (1) determines the cancellation by a cancelling operation using the automatic regeneration cancelling operation component (13) on the basis of operation position information detected by a sensor configured to detect a operation position of the automatic regeneration cancelling operation component (13), and calculates the number of cancellation (N).

In the exhaust treatment device (41), the engine equipped machine is determined to be a parked state when a parking brake of the engine equipped machine is in a braking state and that a clutch for transmitting power from an engine (15) of the engine equipped machine to working equipment is in a disengaged state.

This enables the exhaust treatment device (41) to accurately determine the practical parked state.

The determination of the parked state is performed by the electronic control device (1) on the basis of the operation position information from the sensor that has detected the operation position of a brake operation component (60) when the parking brake is in the braking state, or the operation position information from the sensor that has detected the operation position of a clutch operation component (61) when the clutch is in the disengaged state.

In the exhaust treatment device (41), a fuel purge process (S7), (S15) is performed after the regeneration process of the DPF (3) is finished (S6), (S14).

In the fuel purge process (S7), (S15), the liquid fuel (6) remaining in the combustible gas generator (5) is purged.

Accordingly, in the exhaust treatment device (41), the liquid fuel (6) does not remain in the combustible gas generator (5) when the regeneration process of the DPF (3) is normally finished (S6), (S14), thereby facilitating a subsequent regeneration process (S2), (S11) of the DPF (3).

In the exhaust treatment device (41), the air (7) is supplied to the combustible gas generator (5), the air-fuel mixture gas (14) of the air (7) and the liquid fuel (6) remaining in the combustible gas generator (5) generates the combustible gas (8) by a catalytic reaction of the gas generation catalyst (4), and the combustible gas (8) is discharged into the engine exhaust passage (2) in the fuel purge process (S7), (S15).

In the exhaust treatment device (41), the fuel purge process (S7), (S15) is performed in the same manner as the regeneration process (S2), (S11) of the DPF (3), and accordingly, the components and controlling for the fuel purge process (S7), (S15) can be used for the regeneration process (S2), (S11) of the DPF (3).

The exhaust treatment device (41) includes a DOC (16) disposed on an exhaust upstream side of the DPF (3).

In the exhaust treatment device, the combustible gas (8) is subjected to catalytic combustion in the DOC (16) to raise the temperature of the engine exhaust (9) in the regeneration process (S2), (S11) of the DPF.

Accordingly, the exhaust treatment device (41) can suppress power consumption required for the regeneration process (S2), (S11) of the DPF (3) as compared with a case in which heat generation by the electric heater is used.

A DOC is an abbreviation of a diesel oxidation catalyst.

The DOC (16) has a cylindrical shape, and has a flow-through ceramic honeycomb structure in which a large number of cells are arranged in the axial direction in a penetrating manner, and each of the cells carries an oxidation catalyst component, such as platinum and rhodium of palladium.

The DOC (16) is housed in the DPF case (42) on an exhaust upstream side of the DPF (3).

The exhaust treatment device (41) includes an ignition component (17) disposed on an exhaust upstream side of the DOC (16).

In the exhaust treatment device (41), the ignition component (17) ignites the combustible gas (8) when an estimated temperature of the DOC (16) is less than a predetermined activation temperature, flaming combustion of the combustible gas (8) raises a temperature of the engine exhaust (9), and a temperature of the DOC (16) is raised by heat of the engine exhaust (9) to activate the DOC (16) in the regeneration process (S2), (S11) of the DPF.

Accordingly, the exhaust treatment device (41) can perform the regeneration process (S2), (S11) of the DPF (3) even when temperature of the engine exhaust (9) is low.

The ignition component (17) is disposed in the ignition chamber (47) of the exhaust treatment device (41), and a DOC inlet-side exhaust gas temperature sensor (62) is disposed at an exhaust inlet of the DOC (16), the ignition component (17) and the DOC inlet-side exhaust gas temperature sensor (62) are electrically connected to the electronic control device (1). When an inlet-side exhaust gas temperature of the DOC (16) is less than the activation temperature of the DOC (16), the ignition component (17) generates heat according to an instruction of the electronic control device (1) based on an inlet-side exhaust gas temperature information of the DOC (16), and the combustible gas (8) is ignited.

A glow plug is used as the ignition component (17). An ignition plug or a burner may be used as the ignition component (17).

The ignition chamber (47) includes an ignition detection sensor (54). The ignition detection sensor (54) is electrically connected to the electronic control device (1), and the electronic control device (1) determines whether the combustible gas (8) is ignited or not on the basis of the temperature information of the ignition chamber (47) detected by the ignition detection sensor (54).

In the exhaust treatment device (41), the parked regeneration process (S11) is performed when an alternative first condition instead of the first condition and the second condition are satisfied.

The alternative first condition is that the parked regeneration requirement notification component (10) performs a notification of a parked regeneration requirement (S8) when an accumulated value of time (T) elapsed without finishing the automatic regeneration process (S2) reaches a predetermined parked regeneration requirement determination value (TJ) or more.

Accordingly, the exhaust treatment device (41) can lead a driver or the like to conduct the parked regeneration process (S11) even when the automatic regeneration process (S2) continues for a long period of time, thereby raising the success rate of regeneration of the DPF (3).

In the exhaust treatment device (41), the temperature of the engine exhaust (9) after a temperature rise due to the regeneration process (S2), (S11) of the DPF (3) is higher after the parked regeneration process (S11) than after the automatic regeneration process (S2).

Accordingly, the exhaust treatment device (41) can shorten the time required for regeneration of the DPF (3) in the parked regeneration process (S11).

The temperature of the engine exhaust (9) is controlled by adjusting the generation amount of the combustible gas (8).

A DPF inlet-side exhaust gas temperature sensor (63) is disposed at an exhaust inlet of the DPF (3). The generation amount of the combustible gas (8) is adjusted according to an instruction of the electronic control device (1) based on a DPF inlet-side exhaust gas temperature information detected by the sensor (63), thereby adjusting a DPF inlet-side exhaust gas temperature to a predetermined regeneration temperature.

Note that a DPF outlet-side exhaust gas temperature sensor (64) is disposed at an exhaust outlet of the DPF (3). The regeneration process (S2), (S11) of the DPF (3) is stopped according to an instruction of the electronic control device (1) based on a DPF outlet-side exhaust gas temperature information detected by the sensor (64), thereby preventing excessive combustion of the PM in the DPF (3).

The flow of the DPF regeneration process by the electronic control device shown in FIG. 2 is described below.

In step (S1), it is determined whether or not the estimation value (F) of the PM accumulated in the DPF (3) reaches the automatic regeneration start determination value (SJ). The determination of step (S1) is repeated until the determination is affirmed. When the determination is affirmed, the flow proceeds to step S2.

In step (S2), the automatic regeneration process of the DPF (3) is performed, and then the flow proceeds to step (S3).

In step (S3), it is determined whether or not the number of cancellation (N) of the automatic regeneration reaches a parked regeneration requirement determination value (NJ). When the determination is denied, the flow proceeds to step (S4).

In step (S4), it is determined whether or not the estimation value (F) of the PM accumulated in the DPF (3) reaches a regeneration end determination value (FJ). When the determination is denied, the flow proceeds to step (S5).

In step (S5), it is determined whether or not the accumulated value of elapsed time (T) of the automatic regeneration process reaches the parked regeneration requirement determination value (TJ). When the determination is denied, the flow returns to step (S1).

When the determination is affirmed in step (S4), i.e., when the estimation value (F) of the PM accumulated in the DPF (3) reaches the regeneration end determination value (FJ), the flow proceeds to step (S6).

In step (S6), the automatic regeneration process is finished, the flow proceeds to step (S7).

In step (S7), the fuel purge process is performed, and the flow returns to step (51).

When the determination is affirmed in step (S3), i.e., when the number of cancellation (N) of the automatic regeneration reaches the parked regeneration requirement determination value (NJ), the flow proceeds to step (S8).

In step (S8), the parked regeneration requirement is notified, then the flow proceeds to step (S9).

In step (S9), it is determined whether or not the engine equipped machine is in a parked state. When the determination is affirmed, the flow proceeds to step (S10).

In step (S10), it is determined whether or not the start operation of the parked regeneration process has been performed. When the determination is affirmed, the flow proceeds to step (S11).

In step (S11), the parked regeneration process is performed, then the flow proceeds to step (S12).

In step (S12), it is determined whether or not the parked regeneration stop operation has been performed. When the determination is denied, the flow proceeds to step (S13).

In step (S13), it is determined whether or not the estimation value (F) of the PM accumulated in the DPF (3) reaches the regeneration end determination value (FJ). When the determination is denied, the flow returns to step (S11). When the determination is affirmed in step (S13), the flow proceeds to step (S14).

In step (S14), the parked regeneration process is finished, the flow proceeds to step (S15).

In step (S15), the fuel purge process is performed, then the flow returns to step (51).

When the determination is affirmed in step (S5), i.e., when the accumulated value of the elapsed time (T) of the automatic regeneration process reaches the parked regeneration requirement determination value (TJ), then the flow proceeds to step (S8).

When the determination in step (S9) is denied, when the determination in step (S10) is denied, or when the determination in step (S12) is affirmed, i.e., when the engine equipped machine is determined to not in a parked state, when the engine equipped machine is determined to be in a parked state but the operation of the parked regeneration is determined to be not started, or when the parked regeneration stop operation is determined to be performed during the parked regeneration process, the flow then returns to step (S1).

What is claimed is:

1. An exhaust treatment device for a diesel engine including: a diesel particulate filter (DPF) disposed in an engine exhaust passage; a combustible gas generator including a gas generation catalyst; and an electronic control device,
a regeneration process of the DPF is performed according to an instruction of the electronic control device,
in the regeneration process of the DPF a liquid fuel and air are supplied to the combustible gas generator to form an air-fuel mixture during engine operation, wherein a combustible gas is generated by a catalytic reaction of the air-fuel mixture in the presence of the gas generation catalyst, wherein an engine exhaust temperature is raised by combustion of the combustible gas, and wherein particulate material (PM) accumulated in the DPF is burned off by heat of the engine exhaust,
the exhaust treatment device for a diesel engine further including:
a parked regeneration requirement notification component; and
a parked regeneration start operation component, wherein
the regeneration process of the DPF includes an automatic regeneration process and a parked regeneration process,
the automatic regeneration process is automatically started when an estimated amount of PM accumulated on the DPF reaches a predetermined value, and
the parked regeneration process is performed when a first condition and a second condition are satisfied, the first condition is that the parked regeneration requirement notification component performs a notification of a parked regeneration requirement when a number of cancellations of the automatic regeneration process is equal to or greater than a predetermined value, the second condition is that the parked regeneration start operation component is subjected to a start operation during a parked state in which an engine equipped machine is neither traveling nor working,
the parked regeneration process is performed when an alternative first condition instead of the first condition and the second condition are satisfied, and
the alternative first condition is that the parked regeneration requirement notification component performs a notification of a parked regeneration requirement when an accumulated value of time elapsed without finishing the automatic regeneration process reaches a predetermined parked regeneration requirement determination value or more.

2. The exhaust treatment device for a diesel engine according to claim 1, wherein
the number of cancellations of the automatic regeneration process includes cancellations caused by an engine stop operation using a key switch during the automatic regeneration process and cancellations due to an engine stall occurred during the automatic regeneration process.

3. The exhaust treatment device for a diesel engine according to claim 2, further comprising an automatic regeneration cancelling operation component, wherein
the number of cancellations of the automatic regeneration process includes cancellations by a cancelling operation using the automatic regeneration cancelling operation component.

4. The exhaust treatment device for a diesel engine according to claim 2, wherein
the engine equipped machine is determined to be a parked state when the electronic control device detects that a parking brake of the engine equipped machine is in a braking state and that a clutch for transmitting power from an engine of the engine equipped machine to working equipment is in a disengaged state.

5. The exhaust treatment device for a diesel engine according to claim 2, wherein
a fuel purge process is performed after the regeneration process of the DPF is finished, and
in the fuel purge process, the liquid fuel remaining in the combustible gas generator is purged.

6. The exhaust treatment device for a diesel engine according to claim 5, wherein
in the fuel purge process, the air is supplied to the combustible gas generator, the air-fuel mixture gas of the air and the liquid fuel remaining in the combustible gas generator generates the combustible gas by a catalytic reaction of the gas generation catalyst, and the combustible gas is discharged into the engine exhaust passage.

7. The exhaust treatment device for a diesel engine according to claim 2, further comprising a diesel oxidation catalyst (DOC) disposed on an exhaust upstream side of the DPF, wherein
in the regeneration process of the DPF, the combustible gas is subjected to catalytic combustion in the DOC to raise the temperature of the engine exhaust.

8. The exhaust treatment device for a diesel engine according to claim 7, further comprising an ignition component disposed on an exhaust upstream side of the DOC, wherein
in the regeneration process of the DPF, the ignition component ignites the combustible gas when an estimated temperature of the DOC is less than a predetermined activation temperature, flaming combustion of the combustible gas raises a temperature of the engine exhaust, and a temperature of the DOC is raised by heat of the engine exhaust to activate the DOC.

9. The exhaust treatment device for a diesel engine according to claim 2, wherein
the temperature of the engine exhaust after a temperature rise due to the regeneration process of the DPF is higher after the parked regeneration process than after the automatic regeneration process.

10. The exhaust treatment device for a diesel engine according to claim 3, wherein
the engine equipped machine is determined to be a parked state when the electronic control device detects that a parking brake of the engine equipped machine is in a braking state and that a clutch for transmitting power from an engine of the engine equipped machine to working equipment is in a disengaged state.

11. The exhaust treatment device for a diesel engine according to claim 3, wherein
a fuel purge process is performed after the regeneration process of the DPF is finished, and
in the fuel purge process, the liquid fuel remaining in the combustible gas generator is purged.

12. The exhaust treatment device for a diesel engine according to claim 11, wherein
in the fuel purge process, the air is supplied to the combustible gas generator, the air-fuel mixture gas of the air and the liquid fuel remaining in the combustible gas generator generates the combustible gas by a catalytic reaction of the gas generation catalyst, and the combustible gas is discharged into the engine exhaust passage.

13. The exhaust treatment device for a diesel engine according to claim 1, wherein the engine equipped machine is determined to be a parked state when the electronic control device detects that a parking brake of the engine equipped machine is in a braking state and that a clutch for transmitting power from an engine of the engine equipped machine to working equipment is in a disengaged state.

14. The exhaust treatment device for a diesel engine according to claim 1, wherein a fuel purge process is performed after the regeneration process of the DPF is finished, and in the fuel purge process, the liquid fuel remaining in the combustible gas generator is purged.

15. The exhaust treatment device for a diesel engine according to claim 14, wherein in the fuel purge process, the air is supplied to the combustible gas generator, the air-fuel mixture gas of the air and the liquid fuel remaining in the combustible gas generator generates the combustible gas by a catalytic reaction of the gas generation catalyst, and the combustible gas is discharged into the engine exhaust passage.

16. The exhaust treatment device for a diesel engine according to claim 1, further comprising a diesel oxidation catalyst (DOC) disposed on an exhaust upstream side of the DPF, wherein in the regeneration process of the DPF, the combustible gas is subjected to catalytic combustion in the DOC to raise the temperature of the engine exhaust.

17. The exhaust treatment device for a diesel engine according to claim 16, further comprising an ignition component disposed on an exhaust upstream side of the DOC, wherein in the regeneration process of the DPF, the ignition component ignites the combustible gas when an estimated temperature of the DOC is less than a predetermined activation temperature, flaming combustion of the combustible gas raises a temperature of the engine exhaust, and a temperature of the DOC is raised by heat of the engine exhaust to activate the DOC.

18. The exhaust treatment device for a diesel engine according to claim 1, wherein the temperature of the engine exhaust after a temperature rise due to the regeneration process of the DPF is higher after the parked regeneration process than after the automatic regeneration process.

* * * * *